Jan. 12, 1965  P. BERGONZO  3,165,005
DRIVING DEVICE OF A MACHINE TOOL SPINDLE
Filed Sept. 5, 1961  2 Sheets-Sheet 1

INVENTOR
PIERRE BERGONZO
By Irwin S. Thompson
ATTY.

Jan. 12, 1965 P. BERGONZO 3,165,005
DRIVING DEVICE OF A MACHINE TOOL SPINDLE
Filed Sept. 5, 1961 2 Sheets-Sheet 2

INVENTOR
PIERRE BERGONZO
By Irwin S. Thompson
ATTY.

United States Patent Office 3,165,005
Patented Jan. 12, 1965

3,165,005
DRIVING DEVICE OF A MACHINE TOOL SPINDLE
Pierre Bergonzo, 117 Rte. de la Capite,
Cologny, Switzerland
Filed Sept. 5, 1961, Ser. No. 135,835
Claims priority, application Switzerland, Oct. 7, 1960,
11,260/60
7 Claims. (Cl. 74—378)

The machining precision of the now existing high precision machine tools, of the type comprising a workpiece or tool carrying spindle driven in rotation, is limited principally by the deformations of the said spindle, due to heating thereof and of the headstock carrying spindle. In fact, in the existing machine tools of this type, particularly the automatic slicing lathes, the spindle driving device is generally totally, or at least partly, located inside of the headstock carrying spindle and, in most cases, in immediate proximity to the spindle itself or of the hollow shaft carrying said spindle. This hollow shaft is in fact generally directly constituted by the output shaft of the gear box of the spindle driving device. In such an arrangement, nearly all of the heat developed by friction in the gear box is transmitted to this hollow shaft and to the spindle. The amount of heat generated by such friction is generally high, it causes significant deformations of the spindle which will hinder or prevent any precision machining.

Other automatic lathes, when having a gear box which does not provide for reverse running, include an inversion device for reversing the direction of rotation of the spindle. This inversion device comprises generally two driving rims directly pivoted on the hollow shaft carrying the spindle. Each of these rims is driven by means of an actuating member, for example chains, in reverse or opposite directions, one from the other. These rims can be alternatively coupled to the hollow shaft carrying the spindle in view of its driving in one or the other direction by the intermediary of clutches. When the spindle is driven in one direction or in the other direction, one of these rims revolves in the same direction as the hollow shaft and has no relative speed with respect to said shaft, whereas the other rim revolves in the opposite direction from said shaft, at a speed of rotation double the speed of the spindle. Due to the fact of the introduction of new cutting materials, the spindle speeds tend to increase, in a constant manner, and it is actually frequent to drive the spindle at speeds of the order of 5000 revolutions per minute and more. Under these conditions, the heating taking place in the bearing of the rim, the relative speed of which with respect to the hollow shaft is double that of the spindle is substantial and will cause deformations of the spindle which are detrimental to the machining precision.

In order to obviate these drawbacks, it is known to use a transmission of the movement by means of chains. In the latter arrangements, the hollow shaft bears generally two rims, each meshing with a chain for driving the spindle in one direction or the other. Such a disposition enables the gear box and the spindle's driving motor to be remotely located in order to diminish heating and thus deformations of the spindle. However, even if this design was acceptable 20 or 30 years ago, it is actually unusable today, since it is absoultely impossible to use such chain transmissions for speeds of rotation of 5000 revolutions per minute or more of the spindle which are actually required by the users.

The present invention has for it object a driving device for the rotary spindle of a machine tool provided with a headstock comprising a driving motor, a gear box and an inversion device for reversing the direction of rotation comprising two driving rims concentric with the axis of rotation of the spindle, driven in reverse or opposite directions and alternatively coupled to the spindle, which comprises further at least one pinion in mesh with the said rims and connected through a unique driving member to the gear box and in which at least one of the rims is rotatably mounted on a support carried by the headstock of the machine tool and in metallic contact with said headstock.

The annexed drawing illustrates schematically and by way of example two embodiments of the present invention.

Figure 1:
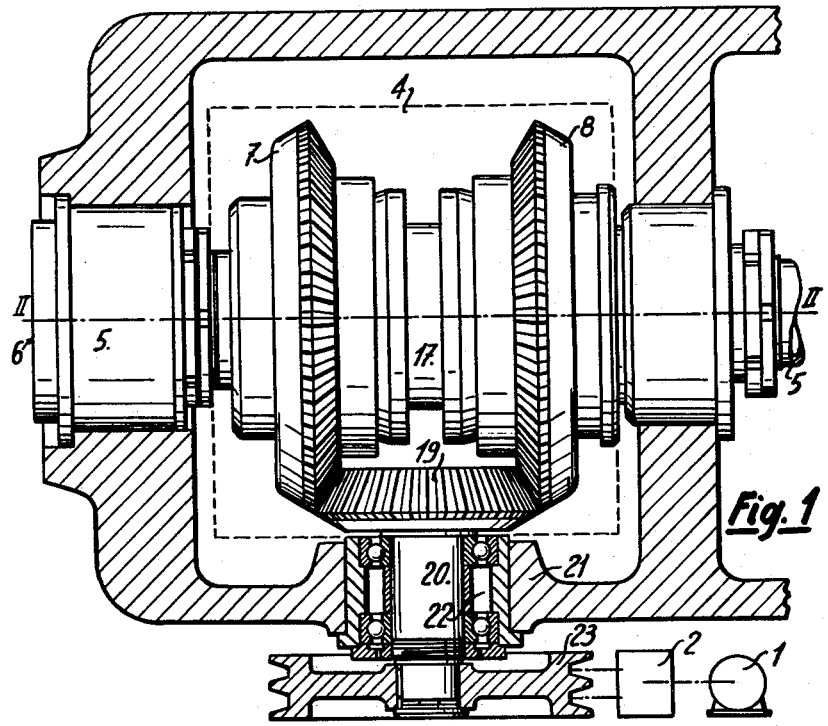
FIG. 1 is a top view of the driving device, the headstock being seen in section.

With reference to the annexed drawing, the driving device comprises a driving motor 1 and a gear box 2, schematically illustrated, both disposed at the outside of a headstock 3 of a machine tool. The motor 1 and the gear box 2 may be any of the well-known types widely used, and accordingly they will not need to be described in detail in the present application.

The driving device comprises further an inversion device 4 serving to selectively reverse the direction of rotation of a hollow shaft 5 mounted in the headstock 3 and carrying a workpiece or a tool carrying spindle 6. This inversion device 4 comprises two toothed rims 7, 8 concentric with the axis of rotation of the hollow shaft 5 and of the spindle 6. The toothed rim 7 is journaled by means of ball bearings 9 directly on the hollow shaft 5, whereas the other toothed rim 8 is rotatably mounted or journaled through the intermediary of ball bearings 10 on a support 11 rigidly connected to the headstock 3. Support 11 is arranged in metallic contact with the headstock 3, but thermally insulated through an air cushion 12 from the hollow shaft 5 bearing the spindle 6. In this way, the quantity of heat produced by friction in the bearing 10 is transmitted to the headstock 3 which has a large dissipation surface and a great thermal inertia so that this quantity of heat produces practically no increase of temperature of the headstock. These toothed rims 7, 8 may be alternatively coupled to the hollow shaft 5 by means of couplings. The driving parts 13, 14 of these couplings are carried by the toothed rims 7, 8 respectively, whereas the driven parts 15, 16 of these couplings are carried by a ring 17 which rotates together with the hollow shaft 5, but is longitudinally displaceable along the latter. The ring 17 is maintained in each of its two axial positions by means of a rocking member 18. These axial positions correspond to the engagement of the driving and driven parts of one or the other couplings (13, 15; 14, 16). The control of the engagement and disengagement of the two parts of each coupling is effected by means of a fork (not shown) engaged in a groove 24 of the ring 17. The two toothed rims 7, 8 are in mesh with a conical pinion 19 fast with a unique driving member constituted by a shaft 20 extending through the outside wall 21 of the headstock 3 and pivoted in a bearing 22. The free extremity of shaft 20 is provided with a grooved pulley 23 mechanically connected, for example by means of belts, to the driving motor 1 through the intermediary of the gear box 2.

During the driving of the spindle 6 in the working direction of rotation, that is to say in the direction of rotation corresponding to nearly the totality of the machining operations and thus to the time during which the spindle 6 is moved in rotation, it is driven by means of the driving motor 1, through the intermediary of the gear box 2, the conical pinion 19, the toothed rim 7 and the coupling 13, 15, the ring 17 being placed in its extreme left hand position, and the hollow shaft 5. Under such conditions, the rim 7, journaled on the hollow shaft 5 does not present any relative speed with respect to this hollow shaft. On the contrary, the toothed rim 8 is rotated in the reverse direction by pinion 19 and therefore has a relative speed equal to twice the speed of rotation of the spindle 6. Moreover, toothed rim 8 is journaled, not on shaft 5, but on the support 11. This support 11 being thermally insulated with respect to the hollow shaft 5 by the air cushion 12, the heat developed in the ball bearing 10 is not transmitted to the hollow shaft 5. Although the desired thermal insulation is preferably obtained by using the air cushion 12 described above, it should be apparent that any other known means of heat insulation may equally be employed. For example, a tube or any nonflammable, good insulating material, such as asbestos, may be disposed between support 11 and hollow shaft 5 in place of the air cushion 12.

With the foregoing construction, it is possible to eliminate any deformation of this hollow shaft 5, as well as of the spindle 6, due to heating. In this way, it becomes possible to machine the workpieces at the very high rotational speeds of the spindle actually demanded with a much higher precision than heretofore possible in the art. Further, the driving motor 1 and the gear box 2 being located outside the headstock 3, the heat dissipated by these members cannot be transmitted to the spindle 6. There results also an increase of the machining precision of such machine tools.

Figure 2:
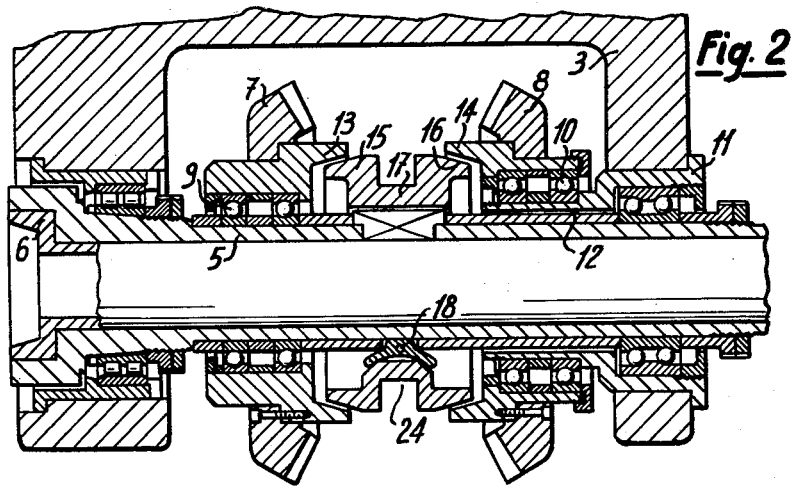
FIG. 2 is a section along line II—II of FIG. 1.

A preferred embodiment of the driving device for a spindle of a machine tool has been described and illustrated by way of example in FIGS. 1 and 2, but it is evident that numerous variations in the details of construction could be employed without departing from the scope of the present invention.

Figure 3:
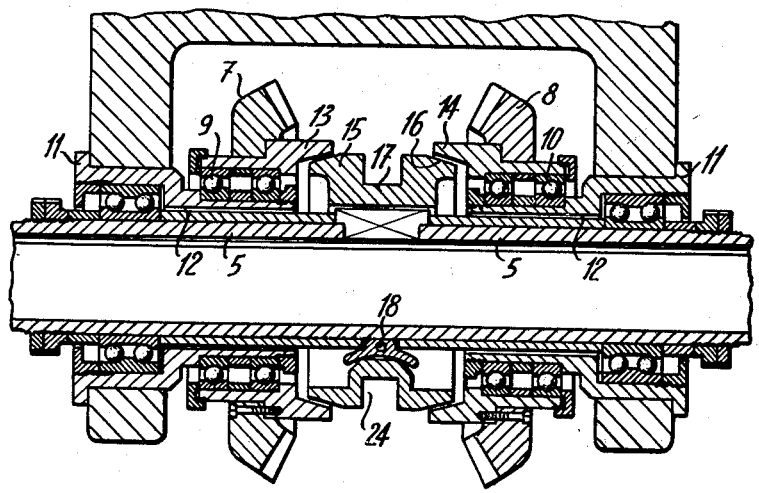
FIG. 3 is a sectional view similar to FIG. 2 of an alternative embodiment of the present invention.

In particular, FIG. 3 illustrates another embodiment of the invention relating to a machine tool in which the spindle in normal operation will revolve in one direction as often as in the other. The machine tool according to FIG. 3 is very similar to that shown in FIG. 2, the same reference numerals referring to like parts in the two figures. In FIG. 3, the two toothed rims 7 and 8 are journaled, respectively, on individual supports 11 and 11'. The additional support 11' is rigidly connected to headstock 3 at the end opposite to support 11. Moreover, support 11' has a similar thermal insulation from the hollow shaft 5 which comprises the second air cushion 12'.

Further, the control of the couplings could be differently effected, by using any of the numerous suitable control means actually available. On the other hand, the rims 7 and 8 could bear rectilinear teeth. In that case, the unique driving member would simultaneously drive two spur pinions in opposite directions of rotation, which pinions would mesh with the rims 7, 8 respectively.

The principal advantages of the spindle driving device according to the invention are the following:

(1) Practically total elimination of the deformations of the spindle due to heating.

(2) Great reduction of the masses that have to be braked and then accelerated again, during a change in the direction of rotation of the spindle for example. In fact, during braking of the spindle, it is disconnected from the two rims, the mass to be braked then being reduced to merely the masses of the spindle and the hollow shaft. But the motor and the gear box continue to be driven, enabling a rapid acceleration of the spindle.

I claim:

1. A device for driving a rotary spindle of a machine tool provided with a headstock, said device comprising driving means located externally of said headstock, inversion means housed inside the headstock for selectively reversing the direction of rotation of the spindle, said inversion means comprising two driving rims mounted concentric with the axis of rotation of the spindle, at least one of said rims having a support upon which it is journaled, said support being carried by said headstock in direct, metallic contact therewith, at least one pinion meshing with both driving rims to rotate them in opposite directions, and coupling means for alternatively coupling either one of said driving rims to said spindle, and a single driving member journaled in a wall of said headstock, said driving member carrying said pinion inside the headstock and being connected to said driving means outside the headstock.

2. A device as defined by claim 1, wherein said driving means comprises a driving motor, a gear box connected to said motor, and transmission means for drivingly interconnecting said single driving member and said gear box.

3. A device as defined by claim 1, and further comprising means for thermally insulating said support from the spindle.

4. A device as defined by claim 1, wherein said support surrounds the spindle, said support being spaced from the spindle to form an air cushion which thermally insulates the spindle from the support.

5. A device as defined by claim 1, wherein said support surrounds the spindle and is spaced therefrom, and a member containing thermal insulating material being disposed in the space between said support and the spindle.

6. A device for driving a rotary spindle of a machine tool provided with a headstock, said device comprising driving means located externally of said headstock, inversion means housed inside the headstock for selectively reversing the direction of rotation of the spindle, said inversion means comprising two driving rims mounted concentric with the axis of rotation of the spindle, each of said rims having an individual support upon which it is journaled, both of said supports being carried by said headstock in direct, metallic contact therewith, at least one pinion meshing with both driving rims to rotate them in opposite directions, and coupling means for alternatively coupling either one of said driving rims to said spindle, and a single driving member journaled in a wall of said headstock, said driving member carrying said pinion inside the headstock and being connected to said driving means outside the headstock.

7. A device as defined by claim 6, and further comprising means for thermally insulating both of said supports from the spindle.

References Cited by the Examiner
UNITED STATES PATENTS

| 2,075,240 | 3/37 | Tavtz | 74—376 |
| 2,602,347 | 7/52 | Miller | 74—378 |
| 2,744,796 | 5/56 | Walters | 308—77 |

DON A. WAITE, *Primary Examiner.*